US010058852B2

(12) United States Patent
Daudin

(10) Patent No.: US 10,058,852 B2
(45) Date of Patent: Aug. 28, 2018

(54) HYDROTREATMENT CATALYST WITH A HIGH DENSITY OF MOLYBDENUM, AND PROCESS FOR ITS PREPARATION

(71) Applicant: IFP Energies nouvelles, Rueil-Malmaison (FR)

(72) Inventor: Antoine Daudin, Corbas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 204 days.

(21) Appl. No.: 14/790,678

(22) Filed: Jul. 2, 2015

(65) Prior Publication Data

US 2016/0001272 A1 Jan. 7, 2016

(30) Foreign Application Priority Data

Jul. 4, 2014 (FR) .................................... 14 56464

(51) Int. Cl.

| | |
|---|---|
| ***B01J 27/19*** | (2006.01) |
| ***B01J 37/02*** | (2006.01) |
| ***B01J 35/10*** | (2006.01) |
| ***C10G 45/08*** | (2006.01) |
| ***B01J 21/04*** | (2006.01) |
| ***B01J 23/882*** | (2006.01) |
| ***C10G 69/04*** | (2006.01) |
| ***B01J 23/883*** | (2006.01) |

(52) U.S. Cl.

CPC ............... *B01J 27/19* (2013.01); *B01J 21/04* (2013.01); *B01J 23/882* (2013.01); *B01J 23/883* (2013.01); *B01J 35/1014* (2013.01); *B01J 35/1019* (2013.01); *B01J 37/0201* (2013.01); *B01J 37/024* (2013.01); *B01J 37/0205* (2013.01); *B01J 37/0236* (2013.01); *C10G 45/08* (2013.01); *C10G 69/04* (2013.01)

(58) Field of Classification Search

CPC .... B01J 27/185; B01J 27/1853; B01J 27/188; B01J 27/19

See application file for complete search history.

(56) References Cited

U.S. PATENT DOCUMENTS

| | | | |
|---|---|---|---|
| 5,116,484 A | 5/1992 | Smegal | |
| 5,290,429 A | 3/1994 | Delaney et al. | |
| 7,879,224 B2 * | 2/2011 | Euzen ..................... | B01J 21/02 208/108 |
| 7,981,828 B2 * | 7/2011 | Devers ................... | B01J 23/882 208/216 R |
| 8,236,723 B2 | 8/2012 | Tunner et al. | |
| 8,637,423 B2 | 1/2014 | Wu et al. | |
| 9,174,202 B2 * | 11/2015 | Marchand ................ | B01J 23/28 |
| 2008/0194892 A1 * | 8/2008 | Cholley ................... | B01J 23/85 585/277 |
| 2009/0321320 A1 | 12/2009 | Wu et al. | |
| 2010/0133148 A1 | 6/2010 | Timmler et al. | |
| 2014/0190869 A1 | 7/2014 | Wu et al. | |
| 2015/0166908 A1 | 6/2015 | Touzalin et al. | |

FOREIGN PATENT DOCUMENTS

| | | |
|---|---|---|
| EP | 0483923 A1 | 5/1992 |
| RU | 2313389 C1 | 12/2007 |
| WO | 2007084437 A2 | 7/2007 |
| WO | 2007084471 A1 | 7/2007 |
| WO | 2014013154 A1 | 1/2014 |
| WO | 2014173878 A1 | 10/2014 |

OTHER PUBLICATIONS

French Search Report for FR1456464 dated Mar. 13, 2015.
Martin, C. et al., Internet Citation, Oct. 21, 2003, pp. 1-186.
English Abstract of RU2313389, Publication Date: Dec. 27, 2007.

* cited by examiner

*Primary Examiner* — Jun Li

(74) *Attorney, Agent, or Firm* — Millen, White, Zelano, Branigan, P.C.

(57) ABSTRACT

The present invention concerns a hydrotreatment catalyst comprising an alumina-based support, at least one metal from group VIB, at least one metal from group VIII and phosphorus, in which:

the specific surface area of the catalyst is in the range 20 to 150 $m^2/g$;

the density of the metal from group VIB, expressed as the number of atoms of metal from group VIB per unit surface area of catalyst, is in the range 7 to 30 atoms of metal from group VIB per $nm^2$ of catalyst;

the catalyst being prepared by impregnation of the metals from group VIB, group VIII and phosphorus onto the support in order to obtain an impregnated catalyst precursor, then drying said impregnated catalyst precursor at a temperature of less than 200° C. and without subsequent calcining.

21 Claims, No Drawings

HYDROTREATMENT CATALYST WITH A HIGH DENSITY OF MOLYBDENUM, AND PROCESS FOR ITS PREPARATION

The present invention relates to a hydrotreatment catalyst and to a process for the preparation of said catalyst for use in hydrodesulphurization of an oil cut, in particular a gasoline cut.

The invention also relates to a process for the hydrodesulphurization of a gasoline cut using a catalyst in accordance with the invention.

PRIOR ART

Oil refining and also petrochemicals are now subject to new restrictions. In fact, the specifications now progressively being adopted by all countries as regards sulphur are severe; an example of the target to be reached is 10 ppm (by weight) of sulphur in commercial gasolines in Europe and in Japan. Gasolines obtained by cracking, whether they be catalytic (FCC, Fluid Catalytic Cracking) or non-catalytic (cokefaction, visbreaking, steam cracking), namely the principal precursors of sulphur in gasoline pools, are the focal point of dealing with the problem with reducing sulphur contents.

One solution for reducing the sulphur content which is well known to the skilled person consists of carrying out a hydrotreatment (or hydrodesulphurization) of the hydrocarbon cuts (and in particular catalytically cracked gasolines) in the presence of hydrogen and a heterogeneous catalyst. However, this process suffers from the major disadvantage of causing a very large drop in the octane number if the catalyst employed is not sufficiently selective. This reduction in the octane number is primarily linked to hydrogenation of the olefins present in this type of gasoline concomitantly with hydrodesulphurization. In contrast to other hydrotreatment processes, the hydrodesulphurization of gasolines must therefore be able to satisfy two opposing constraints: to ensure an intense hydrodesulphurization of the gasolines and to limit the hydrogenation of the unsaturated compounds present.

Thus, the U.S. Pat. No. 5,318,690 proposes a process consisting of fractionating the gasoline, sweetening the light fraction and hydrotreating the heavy fraction over a conventional catalyst then treating it over a ZSM5 zeolite to approximately regain the initial octane number.

The patent application WO 01/40409 claims the treatment of an FCC gasoline under conditions of high temperature, low pressure and a high hydrogen/feed ratio. Under these particular conditions, the recombination reactions resulting in the formation of mercaptans involving the $H_2S$ formed by the desulphurization reaction and the olefins are minimized.

Finally, the U.S. Pat. No. 5,968,346 proposes a layout which allows reaching very low residual sulphur contents by means of a multi-step process: hydrodesulphurization over a first catalyst, separation of the liquid and gaseous fractions, and a second hydrotreatment over a second catalyst. The liquid/gas separation can be used to eliminate the $H_2S$ formed in the first reactor in order to obtain a better compromise between hydrodesulphurization and octane number loss.

Another way of answering the two-pronged problem mentioned above consists of using hydrodesulphurization catalysts which are both active in hydrodesulphurization but also highly selective in hydrodesulphurization compared with the olefin hydrogenation reaction.

Thus, the document US 2009/321320 is known in the art; this discloses hydrodesulphurization catalysts which comprise an active cobalt/molybdenum metallic phase and a support based on high temperature alumina, i.e. calcined at a temperature of more than 800° C., and with a specific surface area in the range 40 to 200 $m^2/g$. The catalysts are obtained by dry impregnation of an aqueous solution containing cobalt, molybdenum and at least one additive in the form of an organic compound.

The document EP 1 892 039 describes selective hydrodesulphurization catalysts comprising at least one support, at least one element from group VIII, at least one element from group VIB and phosphorus, in which the density of the elements from group VIB per unit surface area of the support is in the range $2\times10^{-4}$ to $18\times10^{-4}$ g of oxides of the elements from group VIB per $m^2$ of support, in which the molar ratio of phosphorus to the element from group VIB is in the range 0.27 to 2, in which the quantity of group VIB elements is in the range 1% to 20% by weight of the oxides of elements from group VIB and in which the support has a specific surface area of less than 135 $m^2/g$.

Diesel hydrotreatment catalysts are also known; they comprise a support, at least one metal from group VIB associated with at least one metal from group VIII and have a specific surface area in the range 200 to 300 $m^2/g$ and thus a density of metal from group VIB per unit surface area, expressed as the number of atoms of metal from group VIB per $nm^2$ of catalyst, of less than 7.

Thus, there is still a great deal of interest among refiners in hydrodesulphurization catalysts, in particular for gasoline cuts, which have improved catalytic performances in particular in terms of the catalytic activity in hydrodesulphurization and/or selectivity and which thus, once put into use, can be used to produce a gasoline with a low sulphur content without severely reducing the octane number.

SUMMARY OF THE INVENTION

Thus, the invention concerns a hydrotreatment catalyst comprising an alumina-based support, at least one metal from group VIB, at least one metal from group VIII and phosphorus, in which:

- the specific surface area of the catalyst is in the range 20 to 150 $m^2/g$;
- the density of the metal from group VIB, expressed as the number of atoms of metal from group VIB per unit surface area of catalyst, is in the range 7 to 30 atoms of metal from group VIB per $nm^2$ of catalyst;

the catalyst being prepared by impregnation of the metals from group VIB, group VIII and phosphorus onto the support in order to obtain an impregnated catalyst precursor, then drying said impregnated catalyst precursor at a temperature of less than 200° C. and without subsequent calcining.

The content of the metal from group VIB is generally in the range 3% to 35% by weight of oxide of said metal from group VIB with respect to the total catalyst weight;

The content of the metal from group VIII is generally in the range 0.1% to 10% by weight of oxide of said metal from group VIII with respect to the total catalyst weight;

The phosphorus content is generally in the range 0.3% to 10% by weight of $P_2O_5$ with respect to the total catalyst weight.

Preferably, the (metal from group VIII)/(metal from group VIB) molar ratio is in the range 0.1 to 0.8 and the phosphorus/(metal from group VIB) molar ratio is in the range 0.1 to 0.7.

The catalyst of the invention preferably has a specific surface area in the range 30 to 120 $m^2$/g, preferably in the range 40 to 95 $m^2$/g and highly preferably in the range 50 to 90 $m^2$/g.

Preferably, the density of the metal from group VIB is in the range 7 to 25 atoms of metal from group VIB per $nm^2$ of catalyst, preferably in the range 7 to 20 atoms of metal from group VIB per $nm^2$ of catalyst, preferably in the range 7 to 15 atoms of metal from group VIB per $nm^2$ of catalyst.

The metal from group VIB is selected from tungsten and molybdenum and the metal from group VIII is selected from nickel and cobalt.

In accordance with a preferred embodiment, the metal from group VIB is molybdenum and the metal from group VIII is cobalt.

In the context of the invention, the alumina-based support of the catalyst is obtained from an alumina gel which has been kneaded, shaped and calcined.

In accordance with the invention, the catalyst may further comprise at least one organic compound containing oxygen and/or nitrogen. The oxygen compound may be selected from a carboxylic acid, an alcohol, an aldehyde, an ester, an amine, an aminocarboxylic acid, an aminoalcohol, a nitrile and an amide.

As an example, the organic compound is selected from ethylene glycol, triethylene glycol, glycerol, polyethylene glycol with a molecular weight of 150 to 1500, acetophenone, 2,4-pentanedione, pentanol, acetic acid, maleic acid, oxalic acid, tartaric acid, formic acid, citric acid, a $C_1$-$C_4$ dialkyl succinate, a cyclic oligosaccharide composed of at least 6 $\alpha$(1-4)-linked glucopyranose units, ethylene diamine, tetramethylurea, aminotriacetic acid, 1,2-cyclohexane diamine tetraacetic acid, mono-ethanolamine, acetonitrile, N-methylpyrrolidone, dimethylformamide and ethylene diamine tetraacetic acid.

The invention also concerns a process for the preparation of the catalyst of the invention, which comprises the following steps:

a) depositing the metals from group VIII, group VIB and phosphorus onto the alumina-based support in one or more impregnation steps in order to obtain an impregnated catalyst precursor;

b) drying the impregnated precursor at a temperature below 200° C. without subsequent calcining in order to provide a dry catalyst.

When it also comprises an organic additive, the catalyst of the invention is prepared using a process which comprises the following steps:

i) depositing the metals from group VIII, group VIB, phosphorus and at least one organic compound containing oxygen and/or nitrogen onto the alumina-based support in one or more impregnation steps in order to obtain an impregnated catalyst precursor;

ii) drying the impregnated precursor at a temperature below 200° C. without subsequent calcining in order to provide a dry catalyst.

According to the invention, step i) may comprise the following steps in succession:

i1) impregnating an alumina support with at least one solution containing at least one metal from group VIB, at least one metal from group VIII and phosphorus in order to obtain an impregnated support;

i2) drying the impregnated support obtained in step i1) at a temperature below 200° C. without subsequent calcining in order to obtain a dry catalyst;

i3) impregnating the dry catalyst obtained in step i2) with an impregnation solution comprising at least one organic compound containing oxygen and/or nitrogen in order to obtain a doped catalyst precursor;

i4) optionally, allowing the doped catalyst precursor obtained in step i3) to mature.

Finally, the invention also concerns a process for the hydrodesulphurization of a gasoline cut in which said gasoline cut, hydrogen and a catalyst in accordance with the invention or prepared in accordance with one of the processes which has been sulphurized are brought into contact. Contacting is carried out at:

- a temperature in the range 200° C. to 400° C.;
- a total pressure in the range 1 to 3 MPa;
- an hourly space velocity, defined as the volume flow rate of feed with respect to the volume of catalyst, in the range 1 to 10 $h^{-1}$;
- a hydrogen/gasoline feed volume ratio in the range 100 to 600 NL/L.

The gasoline which is treated using the hydrodesulphurization process is preferably a gasoline obtained from a catalytic cracking unit.

DETAILED DESCRIPTION OF THE INVENTION

The Applicant has now discovered a hydrotreatment catalyst comprising an alumina-based support and metals from groups VIB and VIII of the periodic classification of the elements and phosphorus which, after sulphurization, not only has an improved hydrodesulphurization activity, but also has a high hydrodesulphurization selectivity compared with the olefin hydrogenation reaction.

In accordance with a first aspect, the invention concerns a hydrotreatment catalyst comprising an alumina-based support, at least one metal from group VIB, at least one metal from group VIII and phosphorus, in which:

- the specific surface area of the catalyst is in the range 20 to 150 $m^2$/g;
- the density of the metal from group VIB, expressed as the number of atoms of metal from group VIB per unit surface area of catalyst, is in the range 7 to 30 atoms of metal from group VIB per $nm^2$ of catalyst;

the catalyst being prepared by impregnation of the metals from group VIB, group VIII and phosphorus onto the support in order to obtain an impregnated catalyst precursor, then drying said impregnated catalyst precursor at a temperature of less than 200° C. and without subsequent calcining.

In accordance with the invention, the density of the metal from group VIB, expressed as the number of atoms of metal from group VIB per unit surface area of catalyst (number of atoms of metal from group VIB per $nm^2$ of catalyst) is calculated, for example, from the following relationship:

$$d(\text{metal from group } VIB) = \frac{(X \times N_A)}{(100 \times 10^{18} \times S \times M_M)}$$

in which:

- X=% by weight of metal from group VIB;
- $N_A$=Avogadro's number, equal to $6.022\times10^{23}$;
- S=specific surface area of catalyst ($m^2$/g), measured in accordance with the standard ASTM D3663;
- $M_M$=molar mass of metal from group VIB (for example 95.94 g/mol for molybdenum).

Surprisingly, the inventors have established that a catalyst with the characteristics mentioned above and prepared by impregnation of the metals from groups VIB and VIII and phosphorus then only dried at a temperature of less than 200° C. without subsequently undergoing a calcining step has a high hydrodesulphurization activity and at the same time is more selective as regards the olefin hydrogenation reaction. The gain in activity means that the temperature of the reactor can be reduced in order to obtain the same degree of desulphurization with the advantage of limiting deactivation phenomena due, for example, to coking of the catalyst and thus of keeping the unit in service for an additional period compared with the performances obtained in the presence of state of the art hydrodesulphurization catalysts (HDS). Furthermore, the catalyst of the invention demonstrates an improved hydrodesulphurization selectivity compared with olefin hydrogenation, thus endowing it with an advantageous property in the context of the hydrotreatment of gasoline type hydrocarbon cuts (i.e. with a boiling point which is generally in the range 30° C. to 250° C.) containing olefins where the olefin hydrogenation reaction should be limited in order to limit the loss of octane number of the processed gasoline.

The catalyst of the invention thus comprises a support onto which an active metallic phase is deposited. The support is a porous alumina-based solid, i.e. it contains alumina and possibly metals and/or dopants which have been introduced outside of the step for impregnation of the metals of the active phase. As an example, the metals and/or the dopants have been introduced during the preparation (kneading, peptizing) of the support or when it is being shaped.

Preferably, the support is constituted by alumina. Preferably, the alumina is a delta, gamma or theta alumina, alone or as a mixture.

The pore volume of the alumina support is generally in the range 0.4 $cm^3/g$ to 1.3 $cm^3/g$, preferably in the range 0.6 $cm^3/g$ to 1.1 $cm^3/g$. The total pore volume is measured by mercury porosimetry in accordance with the standard ASTM D4284 with a wetting angle of 140°, as described in the work by Rouquerol F.; Rouquerol J.; Singh K. "*Adsorption by Powders & Porous Solids: Principle, methodology and applications*", Academic Press, 1999, for example using a Micromériticsâ¢ instrument, model Autopore IIIâ¢.

The specific surface area of the alumina support is generally in the range 20 $m^2/g$ to 200 $m^2/g$, preferably in the range 20 $m^2/g$ to 180 $m^2/g$, more preferably in the range 30 $m^2/g$ to 170 $m^2/g$. The specific surface area is determined in the present invention by the BET method in accordance with the standard ASTM D3663; this method has been described in the work cited above.

The alumina support is advantageously in the form of a powder or in the form of beads, extrudates, pellets or irregular and non-spherical agglomerates the specific shape of which may result from a crushing step.

In accordance with a preferred embodiment, the catalyst of the invention comprises an alumina support which is obtained from an alumina gel which essentially comprises a precursor of the aluminium oxy(hydroxide) (AlO(OH)) type—also known as boehmite. The alumina gel (also known as boehmite gel) may be synthesized by precipitation of basic and/or acidic solutions of aluminium salts induced by changing the pH or any other method which is known to the skilled person (P. Euzen, P. Raybaud, X. Krokidis, H. Toulhoat, J. L. Le Loarer, J. P. Jolivet, C. Froidefond, Alumina, in *Handbook of Porous Solids*, Eds F. Schüth, K. S. W. Sing, J. Weitkamp, Wiley-VCH, Weinheim, Germany, 2002, pp. 1591-1677).

In general, the precipitation reaction is carried out at a temperature in the range 5° C. to 80° C. and at a pH in the range 6 to 10. Preferably, the temperature is in the range 35° C. to 70° C. and the pH is in the range 6 to 10.

In one embodiment, the alumina gel is obtained by bringing an aqueous solution of an acidic aluminium salt into contact with a basic solution. As an example, the acidic aluminium salt is selected from the group constituted by aluminium sulphate, aluminium nitrate or aluminium chloride. Preferably, said acid salt is aluminium sulphate. The basic solution is preferably selected from sodium hydroxide or potassium hydroxide. Alternatively, an alkaline solution of aluminium salts which may be selected from the group constituted by sodium aluminate and potassium aluminate may be brought into contact with an acidic solution. In a highly preferred variation, the gel is obtained by bringing a solution of sodium aluminate into contact with nitric acid. The sodium aluminate solution advantageously has a concentration in the range $10^{-5}$ to $10^{-1}$ mol/L; preferably, this concentration is in the range $10^{-4}$ to $10^{-2}$ mol/L. In another embodiment, the alumina gel is obtained by bringing an aqueous solution of acidic aluminium salts into contact with an alkaline solution of aluminium salts. The alumina gel obtained after the precipitation step then undergoes a mixing step, preferably in an acidic medium. The acid employed may, for example, be nitric acid. This step is carried out using known tools such as Z arm mixers, grinder-mixers, or continuous single or twin screws, allowing the gel to be transformed into a product with the consistency of a paste.

In an advantageous embodiment, one or more compounds known as "pore-forming agents" is(are) added to the mixing medium. These compounds have the property of degrading when heated, thereby generating porosity in the support. As an example, wood flour, wood charcoal, tars, and plastic materials may be used as pore-forming agents.

The paste obtained after kneading is, for example, passed through an extrusion die when a support in the form of an extrudate is required. Generally, the extrudates have a diameter in the range 0.4 to 100 mm, preferably in the range 0.5 to 100 mm, more preferably in the range 0.5 to 10 mm and still more preferably in the range 0.4 to 4 mm. These extrudates may be cylindrical, or multi-lobed (for example trilobed or quadrilobed) in shape.

After shaping, the support is optionally dried before undergoing a heat treatment. As an example, drying may be carried out at a temperature in the range 100° C. to 200° C.

The dry support then undergoes a heat treatment step which can endow it with physical properties which are suitable for the envisaged application.

In a first embodiment, the heat treatment comprises at least one step for hydrothermal treatment and at least one calcining step. The term "hydrothermal treatment" denotes a treatment in the presence of water at a temperature above ambient temperature. Preferably, the hydrothermal treatment is carried out at a temperature in the range 100° C. to 300° C., for 0.5 to 8 hours.

During this hydrothermal treatment, the alumina may be treated in various manners. Thus, it is possible to pre-impregnate the alumina with an acidic solution then subject it to a hydrothermal treatment either in the vapour phase or in the liquid phase. This impregnation, before the hydrothermal treatment, may be carried out dry or by immersing the alumina in an aqueous acidic solution. The term "dry impregnation" means bringing the alumina into contact with a volume of solution which is less than or equal to the water take-up volume of the treated alumina. Preferably, the impregnation is dry impregnation.

It is also possible to treat the alumina support which has not been pre-impregnated with an acidic solution, the acidity in this case being provided by an aqueous solution used during the hydrothermal treatment proper.

The aqueous acidic solution comprises at least one acidic compound which can be used to dissolve at least a portion of the alumina. The term "acidic compound which can be used to dissolve at least a portion of the alumina" means any acidic compound which, when brought into contact with the alumina, dissolves at least a portion of the aluminium ions. Preferably, the acid can be used to dissolve at least 0.5% by weight of the alumina of the alumina support. Preferably, this acid is selected from strong acids such as nitric acid, hydrochloric acid, perchloric acid, sulphuric acid or a weak acid used in a concentration such that its aqueous solution has a pH of less than 4, such as acetic acid, or a mixture of these acids.

In accordance with a preferred embodiment, the hydrothermal treatment is carried out in the presence of nitric acid and acetic acid, used alone or as a mixture. This treatment may be carried out in an autoclave, in this case preferably in a rotary basket autoclave such as that defined in patent application EP-A-0 387 109.

The hydrothermal treatment may also be carried out under a saturated vapour pressure or under a partial water vapour pressure of at least 70% of the saturated vapour pressure corresponding to the treatment temperature.

The calcining step which takes place after the hydrothermal treatment in accordance with this first embodiment is carried out at a temperature which is generally in the range 400° C. to 1500° C., preferably in the range 800° C. to 1300° C., for 1 to 8 hours in air with a water content which is generally in the range 0 to 50% by weight.

In accordance with a variation of the first embodiment of the heat treatment step, the dry support may also successively undergo a first calcining step, followed by a hydrothermal treatment step and finally a second calcining step. In this case, the two calcining steps are carried out under the ranges of operating conditions described above, the operating conditions possibly being identical or different in each of the calcining steps.

In accordance with a second alternative heat treatment embodiment, the support only undergoes one calcining heat treatment, i.e. there is no hydrothermal treatment before or after this calcining step. This is carried out at a temperature which is generally in the range 400° C. to 1500° C., preferably in the range 500° C. to 1200° C., for 1 to 8 hours in air with a water content which is generally in the range 0 to 50% by weight. In this embodiment, the calcining step may be carried out in several steps with increasing constant temperature stages until the desired final calcining temperature is reached.

At the end of the final heat treatment, the support has a specific surface area which is generally in the range 20 to 200 $m^2/g$. The support has a crystallographic structure of the delta, gamma or theta alumina type, used alone or as a mixture. The existence of the various crystallographic structures is primarily linked to the conditions under which the heat treatment is carried out, in particular at the final calcining temperature.

The catalyst of the invention is composed of an alumina support, phosphorus and an active phase formed by at least one metal from group VIB and at least one metal from group VIII. During its preparation, the catalyst does not undergo calcining, i.e. the impregnated catalyst precursor does not undergo a heat treatment step at a temperature of more than 200° C.

The total quantity of metal from group VIII is in the range 0.1% to 10% by weight of oxide of the metal from group VIII with respect to the total catalyst weight, preferably in the range 0.6% to 8% by weight, preferably in the range 2% to 7%, highly preferably in the range 2% to 6% by weight and still more preferably in the range 3% to 6% by weight of oxide of the metal from group VIII with respect to the total catalyst weight.

The quantity of metal from group VIB is in the range 3% to 35% by weight of oxide of the metal from group VIB with respect to the total catalyst weight, preferably in the range 5% to 30% by weight, preferably in the range 7% to 28% by weight, highly preferably in the range 10% to 25% by weight of oxide of the metal from group VIB with respect to the total catalyst weight.

The catalyst of the invention has a phosphorus content which is generally in the range 0.3% to 10% by weight of $P_2O_5$ with respect to the total catalyst weight, preferably in the range 2% to 8% by weight of $P_2O_5$ with respect to the total catalyst weight. As an example, the phosphorus present in the catalyst is combined with the metal from group VIB and optionally also with the metal from group VIII in the form of heteropolyanions.

The hydrotreatment catalyst of the invention, in the oxide form, is characterized by a specific surface area in the range 20 to 150 $m^2/g$, preferably in the range 30 to 120 $m^2/g$, preferably in the range 40 to 95 $m^2/g$, highly preferably in the range 50 to 90 $m^2/g$.

Furthermore, the density of metal from group VIB in the catalyst, expressed as the number of atoms of said metal per unit surface area of catalyst, is in the range 7 to 30 atoms of metal from group VIB per $nm^2$ of catalyst, preferably in the range 7 to 25 atoms of metal from group VIB per $nm^2$ of catalyst and highly preferably in the range 7 to 20 atoms of metal from group VIB per $nm^2$ of catalyst. Still more preferably, the density of the metal from group VIB, expressed as the number of atoms of said metal per unit surface area of catalyst, is in the range 7 to 15 atoms of metal from group VIB per $nm^2$ of catalyst. By way of example, if the catalyst contains 20% by weight of molybdenum oxide $MoO_3$ (i.e. 13.33% by weight of Mo) and has a specific surface area of 100 $m^2/g$, the density d(Mo) is equal to:

$$d(Mo) = \frac{(13.33 \times N_A)}{(100 \times 10^{18} \times 100 \times 96)} = 8.3 \text{ atoms of Mo/nm}^2 \text{ of catalyst}$$

The molar ratio of metal from group VIII to metal from group VIB of the catalyst is generally in the range 0.1 to 0.8, preferably in the range 0.2 to 0.6.

Furthermore, the phosphorus/(metal from group VIB) molar ratio is generally in the range 0.1 to 0.7, preferably in the range 0.2 to 0.6.

The metal from group VIB present in the active phase of the catalyst is preferably selected from molybdenum and tungsten.

The metal from group VIII present in the active phase of the catalyst is preferably selected from cobalt, nickel and a mixture of these two elements.

The active phase of the catalyst is preferably selected from the group formed by the following combination of elements: nickel-molybdenum, cobalt-molybdenum and nickel-cobalt-molybdenum; highly preferably, the active phase is constituted by cobalt and molybdenum.

The catalyst of the invention is prepared in accordance with a process comprising the following steps:

a) bringing at least one component of a metal from group VIB, at least one component of a metal from group VIII, and phosphorus into contact with the support in a manner such that a catalyst precursor is obtained;

b) drying said catalyst precursor obtained from step a) at a temperature of less than 200° C. without subsequent calcining.

Step a) for bringing into contact with the support includes several embodiments. In accordance with a first embodiment of step a) of the catalyst preparation process, said components of the metals from group VIB, group VIII and phosphorus are deposited on said support using one or more co-impregnation steps, i.e. said components of the metals from group VIB, group VIII and phosphorus are simultaneously introduced onto said support. The co-impregnation step or steps is (are) preferably carried out by dry impregnation or by impregnation with an excess of solution. When this first embodiment comprises carrying out several co-impregnation steps, each co-impregnation step is preferably followed by an intermediate drying step, generally at a temperature below 200° C., advantageously in the range 50° C. to 180° C., preferably in the range 60° C. to 150° C., highly preferably in the range 75° C. to 140° C.

In accordance with a preferred co-impregnation implementation, when it contains cobalt, molybdenum and phosphorus, the aqueous impregnation solution is prepared under pH conditions which favour the formation of heteropolyanions in solution. As an example, the pH of such an aqueous solution is in the range 1 to 5.

In accordance with a second embodiment of step a) of the catalyst preparation process, the catalyst precursor is prepared by depositing, in succession and in any order, a component of a metal from group VIB, a component of a metal from group VIII and phosphorus onto said support. Depositing may be carried out by dry impregnation, by excess impregnation or indeed by depositing-precipitation using methods which are well known to the skilled person. In this second embodiment, the components of the metals from groups VIB and VIII and phosphorus may be deposited by means of several impregnations with an intermediate drying step between two successive impregnations, generally at a temperature in the range 50° C. to 180° C., preferably in the range 60° C. to 150° C., highly preferably in the range 75° C. to 140° C.

Irrespective of the way in which the metals and phosphorus are deposited, the solvent which is used in the composition of the impregnation solutions is selected in a manner so as to dissolve the metallic precursors of the active phase, such as water or an organic solvent (for example an alcohol).

By way of example, sources of molybdenum which may be used include oxides and hydroxides, molybdic acids and their salts, in particular ammonium salts such as ammonium molybdate, ammonium heptamolybdate, phosphomolybdic acid ($H_3PMo_{12}O_{40}$), and their salts, and optionally silicomolybdic acid ($H_4SiMo_{12}O_{40}$) and its salts. The sources of molybdenum may also be any heteropolycompound of the Keggin, lacunary Keggin, substituted Keggin, Dawson, Anderson, Strandberg type, for example. Preferably, molybdenum trioxide is used along with heteropolycompounds of the Keggin, lacunary Keggin, substituted Keggin and Strandberg type.

The tungsten precursors which may be used are also well known to the skilled person. As an example, sources of tungsten which may be used include oxides and hydroxides, tungstic acids and their salts, in particular ammonium salts such as ammonium tungstate, ammonium mettungstate, phosphotungstic acid and their salts, and optionally silicotungstic acid ($H_4SiW_{12}O_{40}$) and its salts. The sources of tungsten may also be any heteropolycompound of the Keggin, lacunary Keggin, substituted Keggin or Dawson type, for example. Preferably, oxides and ammonium salts are used such as ammonium metatungstate or Keggin, lacunary Keggin or substituted Keggin type heteropolyanions.

The cobalt precursors which may be used are advantageously selected from oxides, hydroxides, hydroxycarbonates, carbonates and nitrates, for example. Cobalt hydroxide and cobalt carbonate are preferably used.

The nickel precursors which may be used are advantageously selected from oxides, hydroxides, hydroxycarbonates, carbonates and nitrates, for example. Nickel hydroxide and nickel hydroxycarbonate are preferably used.

The phosphorus may advantageously be introduced into the catalyst at various stages of its preparation and in a variety of manners. The phosphorus may be introduced during shaping of said alumina support or, preferably, after this shaping. It may, for example, be introduced just before or just after peptizing the selected matrix, for example and preferably aluminium oxyhydroxide (boehmite), a precursor of alumina. It may also advantageously be introduced alone or as a mixture with at least one of the metals from groups VIB and VIII. The phosphorus is preferably introduced as a mixture with the precursors of the metals from group VIB and group VIII, in totality or in part onto the shaped alumina support, by dry impregnation of said alumina support using a solution containing the precursors of the metals and the phosphorus precursor. The preferred phosphorus source is orthophosphoric acid $H_3PO_4$, but its salts and esters such as ammonium phosphates or their mixtures are also suitable. The phosphorus may also be introduced at the same time as the element(s) from group VIB in the form, for example, of Keggin, lacunary Keggin, substituted Keggin or Strandberg type heteropolyanions.

At the end of the step or steps for impregnation of the metals from group VIII, group VIB and phosphorus, the catalyst precursor undergoes a step b) for drying carried out using any technique known to the skilled person. It is advantageously carried out at atmospheric pressure or under reduced pressure. Preferably, this step is carried out at atmospheric pressure. This step b) is carried out at a temperature of less than 200° C., preferably in the range 50° C. to 180° C., preferably in the range 60° C. to 150° C. and highly preferably in the range 75° C. to 140° C.

Step b) is advantageously carried out in a fluidized bed using air or any other hot gas. Preferably, when drying is carried out in a fluidized bed, the gas used is either air or an inert gas such as argon or nitrogen. Highly preferably, drying is carried out in a fluidized bed in the presence of air.

Preferably, this drying step lasts in the range 30 minutes to 4 hours, preferably in the range 1 hour to 3 hours.

At the end of step b) of the process of the invention, a dry catalyst is obtained which does not undergo any subsequent calcining step, for example in air, at a temperature of more than 200° C.

Before it is used as a hydrotreatment catalyst, it is advantageous for the catalyst to undergo a sulphurization step (activation phase). This activation phase is carried out using methods which are well known to the skilled person, and advantageously in a sulpho-reducing atmosphere in the presence of hydrogen and hydrogen sulphide. The hydrogen sulphide may be used directly or generated by a sulphur-containing agent (such as dimethyldisulphide).

In accordance with another aspect of the invention, the hydrotreatment catalyst as described above further comprises one or more organic compounds containing oxygen and/or nitrogen. A catalyst of this type is designated by the term "doped catalyst" in the remainder of the description. The organic compound present in the catalyst contains more than 2 carbon atoms and at least one oxygen and/or nitrogen atom.

The organic compound containing oxygen may be selected from a carboxylic acid, an alcohol, an aldehyde or an ester. By way of example, the organic compound containing oxygen may be selected from the group constituted by ethylene glycol, triethylene glycol, glycerol, polyethylene glycol with a molecular weight of 150 to 1500, acetophenone, 2,4-pentanedione, pentanol, acetic acid, maleic acid, oxalic acid, tartaric acid, formic acid, citric acid, a cyclic oligosaccharide composed of at least 6 $\alpha$(1-4)-linked glucopyranose units, and a dialkyl succinate. The dialkyl succinate is preferably a $C_1$-$C_4$ dialkyl succinate, preferably selected from the group composed of dimethyl succinate, diethyl succinate, dipropyl succinate and dibutyl succinate. Preferably, the $C_1$-$C_4$ dialkyl succinate used is dimethyl succinate or diethyl succinate. Highly preferably, the $C_1$-$C_4$ dialkyl succinate is dimethyl succinate. In accordance with one embodiment, the organic compound comprises at least the combination of $C_1$-$C_4$ dialkyl succinate, in particular dimethyl succinate, and acetic acid.

The organic compound containing nitrogen may be selected from an amine. By way of example, the organic compound containing nitrogen may be ethylene diamine or tetramethylurea.

The organic compound containing oxygen and nitrogen may be selected from an aminocarboxylic acid, an amino-alcohol, a nitrile or an amide. By way of example, the organic compound containing oxygen and nitrogen may be aminotriacetic acid, 1,2-cyclohexane diamine tetraacetic acid, mono-ethanolamine, acetonitrile, N-methylpyrrolidone, dimethylformamide or ethylene diamine tetraacetic acid (EDTA).

The doped catalyst of the invention is prepared using a process comprising the following steps:

i) bringing at least one component of a metal from group VIB, at least one component of a metal from group VIII, phosphorus and at least one organic compound containing oxygen and/or nitrogen into contact with the support in a manner such that a doped catalyst is obtained;

ii) drying said doped catalyst precursor obtained from step i) at a temperature of less than 200° C. without subsequent calcining.

The molar ratio of the organic compound(s) containing oxygen and/or nitrogen with respect to the element(s) from group VIB engaged in the doped catalyst precursor is in the range 0.05 to 9 mol/mol, preferably in the range 0.1 to 8 mol/mol, preferably in the range 0.2 to 7 mol/mol before drying in step ii).

As an example, when the organic component is a mixture of $C_1$-$C_4$ dialkyl succinate (in particular dimethyl succinate) and acetic acid, said components are advantageously introduced in a quantity corresponding:

- to a molar ratio of dialkyl succinate (for example dimethyl) to the element(s) from group VIB of the doped catalyst precursor in the range 0.05 to 2 mol/mol, preferably in the range 0.1 to 1.8 mol/mol, more preferably in the range 0.15 to 1.5 mol/mol;
- to a molar ratio of acetic acid to the element(s) from group VIB of the doped catalyst precursor in the range 0.1 to 5 mol/mol, preferably in the range 0.5 to 4 mol/mol, preferably in the range 1.3 to 3 mol/mol and highly preferably in the range 1.5 to 2.5 mol/mol.

Contact step i) comprises several implementational modes.

In accordance with a first implementation of step i) of the process for the preparation of the doped catalyst, the components of the metals from group VIB and group VIII, phosphorus and that of the organic compound are deposited on the support using at least one co-impregnation step, preferably dry impregnation. In accordance with this implementation, said components of the metals from group VIB and group VIII, phosphorus and the organic compound are introduced simultaneously into said support. This first implementation of step i) comprises the use of one or more co-impregnation steps, each co-impregnation step preferably being followed by an intermediate drying step, generally at a temperature of less than 200° C., advantageously in the range 50° C. to 180° C., preferably in the range 60° C. to 150° C., highly preferably in the range 75° C. to 140° C.

In accordance with a second embodiment of step i) of the process for the preparation of the doped catalyst, at least one organic compound containing oxygen and/or nitrogen is brought into contact with at least one catalytic precursor comprising at least one metal from group VIII, at least one metal from group VIB, phosphorus and the support. This second embodiment is a preparation known as "post-impregnation of organic compound". This is carried out by dry impregnation, for example.

In accordance with this second implementation, the contact of step i) comprises the following steps in succession which will be described in detail below:

i1) impregnating an alumina support with at least one solution containing at least one metal from group VIB, at least one metal from group VIII and phosphorus in order to obtain an impregnated support;

i2) drying the impregnated support obtained in step i1) at a temperature below 200° C. without subsequent calcining in order to obtain a dry catalyst;

i3) impregnating the dry catalyst obtained in step i2) with an impregnation solution comprising at least one organic compound containing oxygen and/or nitrogen in order to obtain a doped catalyst precursor;

i4) optionally, allowing the doped catalyst precursor obtained in step i3) to mature.

In step i1), the metals from group VIB and from group VIII are advantageously introduced to the alumina support via one or more steps for impregnation of an excess of solution onto the alumina-based support or, as is preferable, by one or more steps for dry impregnation of said alumina-based support using an aqueous or organic solution containing precursors of the metals. The precursors of the metal from group VIB, group VIII and phosphorus are those described above. Introduction of the metals from group VIB and group VIII and phosphorus onto the alumina support is then followed by a step i2) for drying, during which the solvent (which is generally water) is eliminated, at a temperature of less than 200° C., preferably in the range 50° C. to 180° C., preferably in the range 60° C. to 150° C. or indeed in the range 75° C. to 140° C. The step for drying the impregnated support obtained thereby is never followed by a step for calcining in air at a temperature of 200° C. or more.

It should be noted that steps i1) and i2) respectively correspond to steps a) and b) of the process for the preparation of the "non-doped" catalyst of the invention described above.

In accordance with step i3), the dry catalyst is impregnated with an impregnation solution comprising at least one organic compound containing oxygen and/or nitrogen. The impregnation solution comprising at least one organic compound is preferably an aqueous solution.

Said organic compound(s) may advantageously be deposited in one or more steps either by excess impregnation or by dry impregnation, or by any other means known to the skilled person. Preferably, the organic compound is introduced in a single impregnation step, particularly preferably in a single dry impregnation step.

In accordance with step i4) of the preparation process, The precursor for the doped catalyst obtained from step i3) may undergo a maturation step which is advantageously carried out at atmospheric pressure, at a temperature in the range 17° C. to 50° C. The maturation period is generally in the range 10 minutes to 48 hours, preferably in the range 30 minutes to 5 hours.

In accordance with step ii) of the preparation process, after an optional maturation step, the doped catalyst precursor undergoes a drying step at a temperature below 200° C., without subsequent calcining.

Drying step ii) of the process of the invention is advantageously carried out using any technique which is known to the skilled person. It is advantageously carried out at atmospheric pressure or under reduced pressure. Preferably, this step is carried out at atmospheric pressure.

This step ii) is advantageously carried out at a temperature in the range 50° C. to 180° C., preferably in the range 60° C. to 150° C. and highly preferably in the range 75° C. to 140° C. Step ii) may advantageously be carried out in a fluidized bed using air or any other hot gas. Preferably, when drying is carried out in a fluidized bed, the gas used is either air, or an inert gas such as argon or nitrogen. Highly preferably, drying is carried out in a fluidized bed in the presence of air. Preferably, this step ii) lasts in the range 30 minutes to 4 hours, more preferably in the range 1 hour to 3 hours.

At the end of step ii) of the process of the invention, a doped catalyst is obtained which does not undergo any subsequent catalyst steps at a temperature of 200° C. or more.

In accordance with an alternative embodiment, the process for the preparation of the doped catalyst combines co-impregnation of an organic compound and post-impregnation of an organic compound which may be identical to or different from that used for co-impregnation.

This embodiment comprises the following steps:

i) bringing a solution containing at least one component of a metal from group VIB, at least one component of a metal from group VIII, phosphorus and at least one organic compound containing oxygen and/or nitrogen into contact with the support by co-impregnation in a manner so as to obtain a precursor of the doped catalyst;

i') drying said doped catalyst precursor obtained from step i) at a temperature of less than 200° C., without calcining it subsequently;

i") bringing the dried and doped catalyst precursor obtained from step i') into contact with a solution of an organic compound containing oxygen and/or nitrogen;

ii) drying the post-impregnated doped catalyst precursor obtained from step i") at a temperature of less than 200° C., without subsequent calcining thereof in order to provide a doped catalyst.

The operating conditions described above are obviously applicable in the context of this embodiment.

Before using it, it is advantageous to activate the doped catalyst. This activation phase corresponds to sulphurization which is carried out using methods that are well known to the skilled person, advantageously in a sulpho-reducing atmosphere in the presence of hydrogen and hydrogen sulphide.

The doped catalyst obtained thus advantageously undergoes a sulphurization step without an intermediate calcining step. Said doped catalyst is advantageously sulphurized in an ex situ or in situ manner. The same sulphurizing agents as those described for the dry catalyst of the invention may be used.

The invention also pertains to a process for the hydrotreatment of a hydrocarbon cut. In particular, the process is a hydrodesulphurization of a hydrocarbon cut with a distillation range in the range 30° C. to 260° C. Preferably, this hydrocarbon cut is a gasoline type cut. Highly preferably, the gasoline cut is an olefinic gasoline cut obtained, for example, from a catalytic cracking unit (Fluid Catalytic Cracking).

The hydrodesulphurization process of the invention can be used to transform the organo-sulphur compounds of the hydrocarbon feed into hydrogen sulphide ($H_2S$) while limiting hydrogenation of the olefins present in said feed as far as possible.

The hydrotreatment process consists of bringing the hydrocarbon cut into contact with the catalyst of the invention and hydrogen under the following conditions:

- a temperature in the range 200° C. to 400° C., preferably in the range 230° C. to 330° C.;
- at a total pressure in the range 1 to 3 MPa, preferably in the range 1.5 to 2.5 MPa;
- an hourly space velocity (HSV), defined as the volume flow rate of feed with respect to the volume of catalyst, in the range 1 to 10 $h^{-1}$, preferably in the range 2 to 6 $h^{-1}$;
- a hydrogen/gasoline feed volume ratio in the range 100 to 600 NL/L, preferably in the range 200 to 400 NL/L.

The catalytic hydrodesulphurization process may be carried out in one or more reactors in series of the fixed bed or ebullated bed type. If the process is carried out using at least two reactors in series, it is possible to provide a device for eliminating $H_2S$ from the effluent obtained from the first hydrodesulphurization reactor before treating said effluent in the second hydrodesulphurization reactor.

EXAMPLES

Example 1

Preparation of a Calcined Catalyst A (not in Accordance with the Invention)

The support S1 for catalyst A was a transition alumina with a specific surface area of 80 $m^2/g$. This transition alumina was obtained after the following steps: thermal decomposition of gibbsite at 800° C. (with a short dwell time of 0.8 second), in order to obtain a transition alumina powder. Washing with water reduced the sodium content and was carried out on the powder, followed by a second rapid dehydration treatment similar to the previous one. The alumina powder obtained thereby was then shaped in a bowl granulator in order to form beads which were then dried at 150° C. Finally, this support underwent a hydrothermal treatment at a high partial pressure of water (100%) for 8 hours, followed by calcining at 850° C.

Catalyst A was prepared by dry impregnation of the support with an aqueous solution containing molybdenum trioxide, cobalt hydroxide and phosphoric acid. The volume of the solution containing the precursors of metals and phosphorus was rigorously equal to the water take-up volume of the support (0.97 mL/g). The concentration of metal precursors in aqueous solution was adjusted so as to obtain the desired percentage by weight of molybdenum, cobalt and phosphorus on the final catalyst. In order to obtain complete dissolution of the metal precursors, the impregnation solution was heated under reflux at 90° C. for 2 hours. After dry impregnation onto the support, the catalyst was allowed to mature for 1 h30 in a vessel saturated with water, oven dried in air at 90° C. then calcined in air at 450° C.

Catalyst A obtained after calcining contained a content of 15.5% by weight of molybdenum ($MoO_3$ equivalent), 3.4% by weight of cobalt (CoO equivalent) and 3.9% by weight of phosphorus ($P_2O_5$ equivalent), a specific surface area of 62 $m^2/g$ and hence a surface density of molybdenum of 10.6 atoms per square nanometer of catalyst. The atomic ratios for this catalyst were: Co/Mo=0.42, P/Mo=0.51.

Example 2

Preparation of a Dry Catalyst B Doped with Urea and Citric Acid and not Containing Phosphorus (not in Accordance with the Invention)

The support S2 of catalyst B was a transition alumina with a specific surface area of 44 $m^2/g$ obtained by re-calcining an alumina support S0 shaped into extrudates in air at 1100° C.

Support S0 was synthesized by a precipitation reaction via a mixture of sodium aluminate and aluminium sulphate. This reaction was carried out at a temperature of 60° C., a pH of 9, for 60 minutes and with stirring at 200 rpm. The gel obtained underwent a mixing step on a Z-arm mixer in order to provide a paste. Extrusion was carried out by passing the paste through a die provided with a 1.6 mm diameter orifice in the shape of a trilobe. The extrudates obtained thereby were dried at 150° C. then calcined at 450° C. in dry air. The support S0 was then calcined in air at 1100° C. and the support S2 was thereby obtained.

Catalyst B was prepared by dry impregnation of the support S2 using an aqueous solution containing precursors of cobalt and molybdenum, respectively cobalt carbonate and ammonium heptamolybdate. This solution also contained urea and citric acid. The concentration of urea and of citric acid was determined so as to obtain a urea/molybdenum and citric acid/molybdenum molar ratio of 3.8 and 0.6 respectively. The volume of the impregnation solution was adjusted with water in order to be strictly equal to the water take-up volume of the support (0.62 mL/g). The concentration of cobalt and molybdenum in solution was adjusted so as to obtain the desired percentage by weight of molybdenum, cobalt and phosphorus on the final catalyst. After impregnation, the catalyst was oven dried in air at 110° C. No calcining in air was carried out afterwards.

Catalyst B obtained after drying contained 15.3% by weight of molybdenum ($MoO_3$ oxide equivalent), 3.3% by weight of cobalt (CoO oxide equivalent), a specific surface area of 34 $m^2/g$ and hence a surface density of molybdenum of 18.7 atoms per square nanometer of catalyst (denoted "dMo"). This catalyst had a Co/Mo atomic ratio of 0.41 and did not contain any phosphorus.

Example 3

Preparation of Dry Catalysts C to I (in Accordance with the Invention)

Catalysts C to I were obtained by dry impregnation using the same protocol as for catalyst A and different supports based on transition alumina, followed by the same maturation and drying steps. No step for calcining in air was carried out after drying. The aqueous impregnation solutions were obtained by dissolving molybdenum trioxide, cobalt hydroxide and phosphoric acid. The quantities of precursors to be introduced in solution were adjusted as a function of the desired contents by weight on the final catalyst.

The aluminas S3, S4 and S5 were prepared by post-treatment of the alumina S0 under varying conditions. The support S3 was obtained by calcining in moist air at 850° C. (at 50% water/kg of dry air). The support S4 was obtained after hydrothermal treatment at 100° C. in the presence of 6.5% acetic acid for 3 hours in an autoclave then calcining at 1000° C. in air. The support S5 was obtained by calcining the support S4 in air at 1150° C.

Table 1 provides the characteristics of the supports S1, S2, S3, S4 and S5 employed.

TABLE 1

| Alumina | Crystallographic phases | $S_{BET}$ ($m^2/g$) | Median diameter by volume (nm) | Total pore volume ($cm^3/g$) |
|---|---|---|---|---|
| S1 | theta, delta | 81 | 44 | 1.03 |
| S2 | alpha, theta | 44 | 56 | 0.63 |
| S3 | gamma | 137 | 18.4 | 0.71 |
| S4 | theta, delta | 78 | 40.7 | 0.84 |
| S5 | alpha, theta | 37 | 58 | 0.62 |

The crystallographic phases were obtained from a diffractogram obtained by X-ray diffraction. The BET specific surface area was determined using the nitrogen adsorption-desorption method in accordance with the standard ASTM D3663-03. The median diameter by volume and the total pore volume were obtained by mercury porosimetry in accordance with the standard ASTM D4284-03.

Table 2 summarizes the metal contents of the catalysts obtained as well as the density (dMo) of the metal from group VIB (molybdenum), expressed as the number of atoms of molybdenum per unit surface area of catalyst (atoms/$nm^2$).

TABLE 2

| Catalysts | Support | $MoO_3$ (% by wt) | CoO (% by wt) | $P_2O_5$ (% by wt) | $S_{BET}$ ($m^2/g$) | dMo (at/$nm^2$) |
|---|---|---|---|---|---|---|
| A (not in accordance) | S1 | 15.5 | 3.4 | 3.9 | 62 | 10.6 |
| B (not in accordance) | S2 | 15.3 | 3.3 | 0 | 34 | 18.7 |
| C (in accordance) | S3 | 22 | 4.6 | 6 | 92 | 10.0 |
| D (in accordance) | S3 | 28 | 5.8 | 7.6 | 82 | 14.6 |
| E (in accordance) | S4 | 11.4 | 2.2 | 3.1 | 65 | 7.3 |
| F (in accordance) | S4 | 16.2 | 3.3 | 4.3 | 59 | 11.3 |
| G (in accordance) | S4 | 22.2 | 4.5 | 6.1 | 52 | 17.7 |
| H (in accordance) | S4 | 24.1 | 4.7 | 6.5 | 51 | 20.0 |
| I (in accordance) | S4 | 28 | 5.8 | 7.6 | 46 | 25.6 |

Example 4

Evaluation of the Catalytic Performances of Catalysts A to I

A model feed representative of a catalytically cracked gasoline (FCC) containing 10% by weight of 2,3-dimethylbut-2-ene and 0.33% by weight of 3-methylthiophene (i.e. 1000 ppm by weight of sulphur in the feed) was used to evaluate the catalytic performances of the various catalysts. The solvent used was heptane.

The hydrodesulphurization reaction (HDS) was operated in a fixed fluidized bed reactor under a total pressure of 1.5 MPa at 210° C., with the HSV=6 $h^{-1}$ (HSV=volume flow rate of feed/volume of catalyst), and a $H_2$/feed volume ratio of 300 NL/L, in the presence of 4 mL of catalyst. Prior to the HDS reaction, the catalyst was sulphurized in situ at 350° C. for 2 hours in a stream of hydrogen containing 15% mol of $H_2S$ at atmospheric pressure.

Each of the catalysts was placed in said reactor in succession. Samples were taken at different time intervals and were analysed by gas phase chromatography in order to observe the disappearance of the reagents and the product formation.

The catalytic performances of the catalysts were evaluated in terms of catalytic activity and selectivity. Expression of the hydrodesulphurization activity (HDS) is based on the rate constant for the HDS reaction of 3-methylthiophene (kHDS), normalized by the volume of catalyst introduced and assuming first order kinetics with respect to the sulphur-containing compound. Expression of the olefin hydrogenation activity (HydO) is based on the rate constant for the hydrogenation reaction of 2,3-dimethylbut-2-ene, normalized by the volume of catalyst introduced and assuming first order kinetics with respect to the olefin.

The selectivity of the catalyst is expressed as the normalized ratio of the rate constants, kHDS/kHydO. The higher the ratio kHDS/kHydO, the more selective is the catalyst.

The values obtained were normalized by taking catalyst A as the reference (relative HDS activity and relative selectivity equal to 100). Thus, the performances are the relative HDS activity and the relative selectivity.

TABLE 3

| Catalysts | Supports | Relative HDS activity | Relative selectivity |
|---|---|---|---|
| A (comparative) | S1 | 100 | 100 |
| B (comparative) | S2 | 78 | 98 |
| C (in accordance) | S3 | 238 | 114 |
| D (in accordance) | S3 | 195 | 118 |
| E (in accordance) | S4 | 125 | 143 |
| F (in accordance) | S4 | 183 | 163 |
| G (in accordance) | S4 | 200 | 169 |
| H (in accordance) | S4 | 213 | 175 |
| I (in accordance) | S4 | 215 | 178 |

The catalysts of the invention all exhibited an improved selectivity for hydrodesulphurization compared with olefin hydrogenation compared with the catalysts not in accordance with the invention, namely A (calcined) and B (catalyst containing no phosphorus).

This improvement in the selectivity of the catalysts is particularly advantageous in the case of implementation in a process for the hydrodesulphurization of gasoline containing olefins where the loss of octane number due to olefin hydrogenation is to be limited as far as possible.

Catalysts C to I are also more active in hydrodesulphurization than the non-conforming catalysts A and B.

Example 5

Preparation of a Dry Catalyst K1 and K2 (in Accordance with the Invention), in the Presence of an Organic Co-Impregnation Molecule Catalysts K1 and K2 were obtained by dry impregnation of the support S4. The volume of the aqueous impregnation solution containing the precursors of the metals and phosphorus was rigorously equal to the water take-up volume of the support (0.91 mL/g). The concentration of metal precursors in aqueous solution was adjusted so as to obtain the desired percentage by weight of molybdenum, cobalt and phosphorus on the final catalyst.

Two impregnation solutions were prepared from the solution obtained by dissolving molybdenum trioxide, cobalt hydroxide and phosphoric acid, adding citric acid thereto as the organic molecule for the first solution and triethylene glycol for the second solution. The first impregnation solution had a citric acid/molybdenum molar ratio of 0.4. The second impregnation solution had a triethylene glycol/molybdenum molar ratio of 0.4 The impregnation solutions were heated under reflux at 90° C. for 2 hours in order to obtain complete dissolution of the metal precursors in solution. These solutions were then impregnated onto the support S4. After dry impregnation, the catalysts were allowed to mature for 1 h30 in a sealed vessel saturated with water, then oven dried in air at 120° C. For catalyst K1 which contains citric acid, the contents by weight in oxide equivalents of molybdenum ($MoO_3$), cobalt (CoO) and phosphorus ($P_2O_5$) were respectively 10.5, 2.2 and 2.9.

For catalyst K2 which contains triethylene glycol, the contents by weight in oxide equivalents of molybdenum ($MoO_3$), cobalt (CoO) and phosphorus ($P_2O_5$) were respectively 10.4, 2.2 and 2.9.

TABLE 4

| Doped catalysts (co-impregnation) | Support | $MoO_3$ (% by wt) | CoO (% by wt) | $P_2O_5$ (% by wt) | $S_{BET}$ ($m^2/g$) | dMo ($at/nm^2$) |
|---|---|---|---|---|---|---|
| K1 | S4 | 10.5 | 2.2 | 2.9 | 58 | 7.5 |
| K2 | S4 | 10.4 | 2.2 | 2.9 | 58 | 7.6 |

Example 6

Preparation of Dry Catalysts L1, L2 and L3 (in Accordance with the Invention) in the Presence of an Organic Molecule by Post-Doping The catalysts L1, L2 and L3 were obtained from the dry catalyst E. A supplemental dry impregnation step was carried out using an aqueous solution comprising one or more organic molecules as a mixture. The volume of the solution was determined from the water take-up volume of the dry catalyst E (at 0.76 mL/g) and as a function of the quantity by weight of catalyst to be prepared.

The precursor for the doped catalyst L1 was obtained by dry impregnation of an aqueous solution containing citric acid. The concentration of citric acid in solution was determined in order to obtain a citric acid/molybdenum molar ratio of 0.4.

The precursor for the doped catalyst L2 was obtained by dry impregnation of an aqueous solution containing triethylene glycol. The concentration of triethylene glycol in solution was determined in order to obtain a triethylene glycol/molybdenum molar ratio of 0.4.

The precursor for the doped catalyst L3 was obtained by dry impregnation of an aqueous solution containing dimethyl succinate and acetic acid. The concentration of dimethyl succinate was determined in order to obtain a molar ratio between the dimethyl succinate and the molybdenum of 0.7 and the volume ratio between the acetic acid and the dimethyl succinate was fixed at 0.75.

After dry impregnation, each of the precursors of the doped catalysts L1, L2, L3 were allowed to mature in air at ambient temperature for 1 h30 in a sealed vessel in an atmosphere saturated with water then dried at 140° C. for 2 hours in a rotary evaporator.

Before doping, the characteristics of the precursors of catalysts L1, L2 and L3 were identical to that of catalyst E.

Example 7

Evaluation of the Performances of Catalysts K1, K2, L1, L2, L3 Compared with Catalysts A and B (not in Accordance)

The performances of the catalysts were determined under the conditions of Example 4. The results are reported in Table 6.

TABLE 6

| Catalysts | Supports | Relative HDS activity | Relative selectivity |
|---|---|---|---|
| A (comparative) | S1 | 100 | 100 |
| B (comparative) | S2 | 78 | 98 |
| K1 (in accordance) | S4 | 255 | 187 |
| K2 (in accordance) | S4 | 303 | 214 |
| L1 (in accordance) | S4 | 273 | 189 |
| L2 (in accordance) | S4 | 255 | 182 |
| L3 (in accordance) | S4 | 288 | 188 |

The catalysts of the invention all have an improved selectivity in hydrodesulphurization compared with the hydrogenation of olefins with respect to catalysts A (calcined) and B (no calcining, and no phosphorus), not in accordance with the invention.

This improvement in the selectivity of the catalysts is of particular advantage in the case of use in a process for the hydrodesulphurization of gasoline containing olefins where the loss of octane number due to olefin hydrogenation is to be limited as far as possible.

In addition, the catalysts exhibit a greatly improved relative HDS activity compared with catalysts A (calcined) and B (no calcining and no phosphorus), not in accordance with the invention. Thus, without wishing to be bound to any particular theory, adding an organic molecule, either by co-impregnation or by post-doping, can, inter alia, substantially increase the relative HDS activity.

The invention claimed is:

1. A hydrotreatment catalyst comprising an porous solid support containing alumina, at least one metal from group VIB, at least one metal from group VIII and phosphorus, in which:

the specific surface area of the catalyst is in the range 20 to 150 $m^2/g$;

the density of the metal from group VIB, expressed as the number of atoms of metal from group VIB per unit surface area of catalyst, is in the range 7 to 30 atoms of metal from group VIB per $nm^2$ of catalyst;

the catalyst being prepared by impregnation of the metals from group VIB, group VIII and phosphorus onto the support in order to obtain an impregnated catalyst precursor, then drying said impregnated catalyst precursor at a temperature of less than 200° C. and without subsequent calcining.

2. The catalyst according to claim 1, in which:

the content of the metal from group VIB is in the range 3% to 35% by weight of oxide of said metal from group VIB with respect to the total catalyst weight;

the content of the metal from group VIII is in the range 0.1% to 10% by weight of oxide of said metal from group VIII with respect to the total catalyst weight;

the phosphorus content is in the range 0.3% to 10% by weight of $P_2O_5$ with respect to the total catalyst weight.

3. The catalyst according to claim 1, in which the (metal from group VIII)/(metal from group VIB) molar ratio is in the range 0.1 to 0.8 and the phosphorus/(metal from group VIB) molar ratio is in the range 0.1 to 0.7.

4. The catalyst according to claim 1, in which the specific surface area of the catalyst is in the range 30 to 150 $m^2/g$.

5. The catalyst according to claim 4, in which the specific surface area of the catalyst is in the range 40 to 95 $m^2/g$.

6. The catalyst according to claim 4, in which the specific surface area of the catalyst is in the range 50 to 90 $m^2/g$.

7. The catalyst according to claim 1, in which the density of the metal from group VIB is in the range 7 to 25 atoms of metal from group VIB per $nm^2$ of catalyst.

8. The catalyst according to claim 7, in which the density of the metal from group VIB is in the range 7 to 20 atoms of metal from group VIB per $nm^2$ of catalyst.

9. The catalyst according to claim 7, in which the density of the metal from group VIB is in the range 7 to 15 atoms of metal from group VIB per $nm^2$ of catalyst.

10. The catalyst according to claim 1, in which the metal from group VIB is selected from tungsten and molybdenum and the metal from group VIII is selected from nickel and cobalt.

11. The catalyst according to claim 10, in which the metal from group VIB is molybdenum and the metal from group VIII is cobalt.

12. The catalyst according to claim 1, in which the porous solid support containing alumina is obtained from an alumina gel which has been kneaded, shaped and calcined.

13. The catalyst according to claim 1, further comprising at least one organic compound containing oxygen and/or nitrogen.

14. The catalyst according to claim 13, in which the organic compound is selected from a carboxylic acid, an alcohol, an aldehyde, an ester, an amine, an aminocarboxylic acid, an aminoalcohol, a nitrile and an amide.

15. The catalyst according to claim 14, in which the organic compound is selected from ethylene glycol, triethylene glycol, glycerol, polyethylene glycol with a molecular weight of 150 to 1500, acetophenone, 2,4-pentanedione, pentanol, acetic acid, maleic acid, oxalic acid, tartaric acid, formic acid, citric acid, a $C_1$-$C_4$ dialkyl succinate, a cyclic oligosaccharide composed of at least 6 $\alpha$(1-4)-linked glucopyranose units, ethylene diamine, tetramethylurea, aminotriacetic acid, 1,2-cyclohexane diamine tetraacetic acid, mono-ethanolamine, acetonitrile, N-methylpyrrolidone, dimethylformamide and ethylene diamine tetraacetic acid.

16. The catalyst according to claim 1, characterized in that it is sulphurized.

17. A process for the preparation of a catalyst according to claim 1, comprising the following steps:

a) depositing the metals from group VIII, group VIB and phosphorus onto the porous solid support containing alumina in one or more impregnation steps in order to obtain an impregnated catalyst precursor;

b) drying the impregnated precursor at a temperature below 200° C. without subsequent calcining in order to provide a dry catalyst.

18. The process for the preparation of a catalyst according to claim 13, comprising the following steps:

i) depositing the metals from group VIII, group VIB, phosphorus and at least one organic compound containing oxygen and/or nitrogen onto the porous solid support containing alumina in one or more impregnation steps in order to obtain an impregnated catalyst precursor;

ii) drying the impregnated precursor at a temperature below 200° C. without subsequent calcining in order to provide a dry catalyst.

19. The process according to claim 18, in which step i) comprises the following steps in succession:

i1) impregnating the porous solid support containing alumina with at least one solution containing at least one metal from group VIB, at least one metal from group VIII and phosphorus in order to obtain an impregnated support;

i2) drying the impregnated support obtained in step i1) at a temperature below 200° C. without subsequent calcining in order to obtain a dry catalyst;

i3) impregnating the dry catalyst obtained in step i2) with an impregnation solution comprising at least one organic compound containing oxygen and/or nitrogen in order to obtain a doped catalyst precursor;

i4) optionally, allowing the doped catalyst precursor obtained in step i3) to mature.

20. A process for the hydrodesulphurization of a gasoline cut in which said gasoline cut, hydrogen and a catalyst according to claim 1 are brought into contact, said catalyst being sulphurized and contact being carried out at:

a temperature in the range 200° C. to 400° C.;

a total pressure in the range 1 to 3 MPa;

an hourly space velocity, defined as the volume flow rate of feed with respect to the volume of catalyst, in the range 1 to 10 $^{-1}$;

a hydrogen/gasoline feed volume ratio in the range 100 to 600 NL/L.

21. The process according to claim 20, in which the gasoline is a gasoline obtained from a catalytic cracking unit.

* * * * *